United States Patent
Yamashita et al.

(10) Patent No.: US 9,174,448 B2
(45) Date of Patent: Nov. 3, 2015

(54) INK JET RECORDING APPARATUS AND INK JET RECORDING METHOD

(71) Applicant: CANON KABUSHIKI KAISHA, Tokyo (JP)

(72) Inventors: Otome Yamashita, Yokohama (JP); Souichi Nagai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/333,330

(22) Filed: Jul. 16, 2014

(65) Prior Publication Data

US 2015/0022585 A1   Jan. 22, 2015

(30) Foreign Application Priority Data

Jul. 19, 2013   (JP) .................................. 2013-150361

(51) Int. Cl.
*B41J 2/15* (2006.01)
*B41J 2/165* (2006.01)
*C09D 11/00* (2014.01)

(52) U.S. Cl.
CPC .......... *B41J 2/16517* (2013.01); *B41J 2/16526* (2013.01); *C09D 11/00* (2013.01)

(58) Field of Classification Search
CPC ........ B41J 2/16517; B41J 2/165; B41J 29/17; B41J 2/18; B41J 2/16523; B41J 2/17; B41J 2202/12; B41J 2/01; B41J 2/2107
See application file for complete search history.

(56) References Cited

U.S. PATENT DOCUMENTS

| | | | |
|---|---|---|---|
| 8,662,649 B2 * | 3/2014 | Zoltner et al. | 347/89 |
| 8,820,887 B2 * | 9/2014 | Kamiyama | 347/29 |
| 2010/0033523 A1 | 2/2010 | Suzuki et al. | |

FOREIGN PATENT DOCUMENTS

| CN | 101024745 A | 8/2007 |
|---|---|---|
| CN | 101643604 A | 2/2010 |
| CN | 101679791 A | 3/2010 |
| JP | 2002-172785 A | 6/2002 |
| JP | 2003-231277 A | 8/2003 |
| JP | 2004-114686 A | 4/2004 |
| JP | 2006-089735 A | 4/2006 |
| JP | 2009-515007 A | 4/2009 |

* cited by examiner

*Primary Examiner* — Lamson Nguyen
(74) *Attorney, Agent, or Firm* — Canon U.S.A. Inc., IP Division

(57) ABSTRACT

An ink jet recording apparatus is provided which includes a recording unit including a recording head having a surface provided with an ejection opening therein, an aqueous ink that is ejected from the ejection opening to record an image on a recording medium, a protection unit including a covering member that covers the surface having the ejection opening, and a recovery unit separate from the covering member, having no member that scrapes the ink deposited in the ink receiving member or sucks the ink from the ejection opening. The recovery unit includes an ink receiving member that receives waste ink discharged from the ejection opening according to preliminary ejection data, directly from the ejection opening without interposing any other member. The aqueous ink contains a self-dispersible pigment containing the carboxyl group or the sulfonate group.

11 Claims, 3 Drawing Sheets

INK JET RECORDING APPARATUS AND INK JET RECORDING METHOD

BACKGROUND OF THE INVENTION

1. Field of the Invention

The present invention relates to an ink jet recording apparatus and an ink jet recording method.

2. Description of the Related Art

Ink jet recording apparatuses can produce recorded article at low cost and are more advantageous than electrophotographic recording apparatuses in power consumption, accordingly having come to be widely used. An ink jet recording apparatus records an image by ejecting an ink from a recording head. However, the ink can clog the ejection openings of the recording head or become thick in an ink flow channel due to the evaporation of the liquid component of the ink. This hinders proper ejection of the ink. When such an undesirable phenomenon occurs, the recording head is subjected to recovery operation for recovering the capability of properly ejecting the ink. This operation may be performed at regular intervals or before or after recording operation.

In general, such recovery operation is performed by preliminarily ejecting a portion of the ink, not intended to record an image, to a cap disposed at a position opposing the surface of the recording head provided with the ejection opening therein (ejection opening face). Alternatively, the ink may be forcibly discharged from the recording head by a negative pressure that is generated by the operation of a suction cap connected to a suction pump with the ejection opening face in contact with the suction cap. However, these recovery operations require a sucking member having a certain level of weight, such as such as the suction cap or the suction pump, and the sucking member needs a space for installation.

On the other hand, awareness of resource saving has risen recently, and accordingly downsizing and weight reduction are demanded of ink jet recording apparatuses. For a response to the demand, Japanese Patent Laid-Open Nos. 2003-231277 and 2004-114686 suggest approaches focusing on a member or a unit for collecting waste ink ejected from the ejection openings to recover the capability of the recording head, but not used for recording.

Ink jet recording allows recording on various types of recording media. In addition, for more satisfactory image recording, various types of ink have been devised according to the intended use, such as inks suitable to record photographic images on glossy paper or the like, or inks suitable to record a document on plain paper or the like. In recent years, ink jet recording has also been employed for recording business documentation including letters or characters, diagrams, and the like. Accordingly, the frequency of use of ink jet recording is increasing remarkably in business use. In business use, high optical density is demanded. From the viewpoint of increasing the optical density of recorded images, self-dispersible pigments are advantageously used as the coloring material of the ink.

Japanese Patent Laid-Open No. 2006-089735 and PCT Japanese Translation Patent Publication No. 2009-515007 disclose self-dispersible pigments developed for increasing the optical density of recorded images, focusing on the functional group to be bonded to the surfaces of the pigment particles.

On the other hand, the present inventors have found through their studies that if the suction member such as a suction cap or a suction pump is omitted from an ink jet recording apparatus for weight reduction and downsizing, the ink discharged for preliminary ejection is undesirably deposited on an ink receiving member. In particular, in the use of a phosphonate groups-containing self-dispersible pigment advantageous in increasing the optical density of recorded image as disclosed in Japanese Patent Laid-Open No. 2006-089735, the pigment particles are rapidly aggregated when the liquid component of the ink has evaporated. Thus, the ink is liable to be deposited like stalagmite on the bottom of the ink receiving member. If preliminary ejection is performed with the waste ink thus deposited, the stalagmite-like deposit of the waste ink is likely to come into contact with the recording head, thereby affecting the operation of the carriage or clogging the ejection openings. Although ink jet recording apparatuses provided with a member adapted to remove or flatten the deposit of the ink in the ink receiving member by scraping the deposit (scraping member) have been known, such a scraping member hinders weight reduction or downsizing.

SUMMARY OF THE INVENTION

The present invention provides an ink jet recording apparatus and an ink jet recording method which use a mechanism that discharges waste ink directly to an ink receiving member from a recording head, and in which the deposition of the ink in the ink receiving member can be suppressed.

According to an aspect of the invention, an ink jet recording apparatus is provided which includes a recording unit including a recording head having a surface provided with an ejection opening therein, an aqueous ink that is ejected from the ejection opening to record an image on a recording medium, a protection unit including a covering member that covers the surface having the ejection opening, and a recovery unit separate from the covering member, having no member that scrapes the ink deposited in the ink receiving member or sucks the ink from ejection opening. The recovery unit includes an ink receiving member that receives waste ink, which is a portion of the ink discharged from the ejection opening according to preliminary ejection data, directly from the ejection opening without interposing any other member. The aqueous ink contains a self-dispersible pigment in which a functional group containing at least one anionic group of the carboxyl group and the sulfonate group is bonded to its particle surface.

Further features of the present invention will become apparent from the following description of exemplary embodiments with reference to the attached drawings.

DESCRIPTION OF THE EMBODIMENTS

Figure 1:
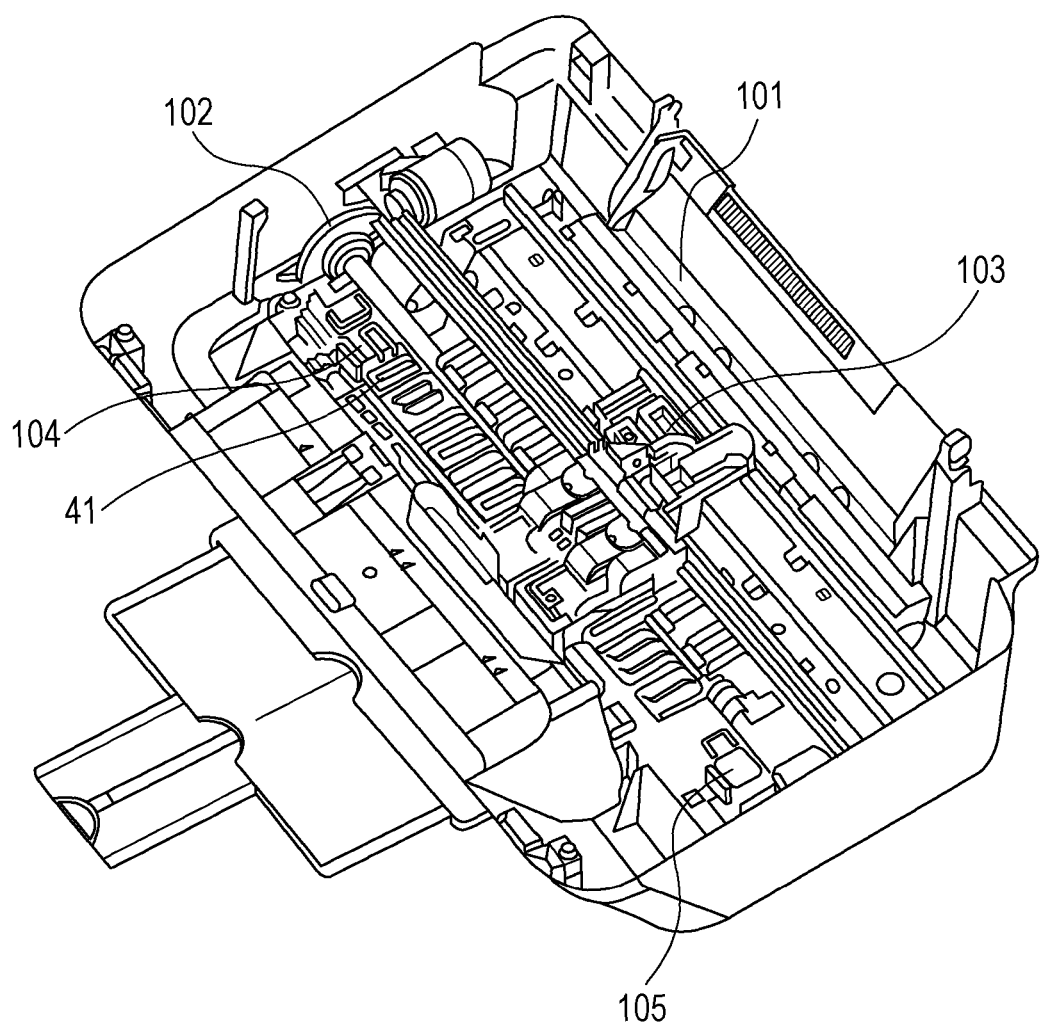
FIG. 1 is a schematic perspective view of an ink jet recording apparatus according to an embodiment of the present invention.

The present invention will be further described in detail with reference to exemplary embodiments.

In the following description, the aqueous ink used in the embodiments of the invention may be simply referred to as the ink. The physical properties mentioned herein are those at room temperature (25° C.) unless otherwise specified.

In an ink jet recording apparatus not provided with a suction member from the viewpoint of weight reduction or downsizing, waste ink is discharged directly to an ink receiving member from a recording head under atmospheric pressure without interposing any other members. When a suction cap, a suction pump or any other suction member is not used, the ink receiving member that receives waste ink discharged for preliminary ejection is more open to the atmosphere than the known recording apparatus. Under these conditions, the waste ink that have discharged to the ink receiving member evaporates considerably rapidly, and accordingly, the flowability of waste ink is lost before the ink spreads to an extent that it is not deposited, and the ink is deposited like stalagmite. This affects the operation of the ink jet recording apparatus or the ejection of the ink, as described above. Some of the ink jet recording apparatuses are provided with a member adapted to remove or flatten the deposit of the ink in the ink receiving member by scraping the deposit (scraping member). Such a scraping member however hinders weight reduction or downsizing.

If a suction member such as a suction cap or a suction pump or a scraping member for scraping deposit of the ink is omitted from an ink jet recording apparatus for weight reduction or downsizing, it becomes difficult to solve the problem of deposition of the ink. Accordingly, the present inventors approached a solution from the ink. Pigments used in inks include self-dispersible pigments and resin-dispersed pigments. An ink containing a resin-dispersed pigment is more likely to maintain the dispersion of the pigment particles than an ink containing a self-dispersible pigment and accordingly to maintain the flowability of the ink, even though the liquid component of the ink evaporates. However, if a resin-dispersed pigment is used to stably maintain the dispersion of pigment particles, the aggregation force of the pigment on the recording medium decreases when an image is recorded. Consequently, the optical density of the image is liable to be reduced.

The present inventors have found through their further studies that the use of a specific self-dispersible pigment as the coloring material of an ink solves the problem of the deposition of the ink in an ink jet recording apparatus including an ink receiving member to which waste ink is discharged directly from a recording head without interposing any other members. More specifically, a self-dispersible pigment in which a functional group containing at least one anionic group of the carboxyl group and the sulfonate group is bonded to its particle surface is used. The present inventors think the reason why such a specific self-dispersible pigment produces the above effect is as below.

self-dispersible pigments containing the carboxyl group or the sulfonate group as an anionic group are reactive with calcium contained as filler or the like in recording media, as with self-dispersible pigments containing a phosphonate group, thus helping increase the aggregation force of the pigment and the optical density of the image. On the other hand, when the liquid component of an ink has evaporated, the aggregation of the pigment particles is caused by the compression of electric double layers between anionic groups, but not by the reaction between the pigment and calcium. In this instance, the aggregation force of self-dispersible pigments containing the carboxyl group or the sulfonate group tends to be smaller than phosphonate group-containing self-dispersible pigments. Accordingly, the carboxyl or sulfonate group-containing self-dispersible pigment tends to maintain the dispersion of the pigment particles stably and accordingly to maintain the flowability of the ink, even though the liquid component of the ink has evaporated. Thus, the deposition of the ink in the ink receiving member can be suppressed without reducing the optical density of recorded images by use of a self-dispersible pigment containing the carboxyl group or the sulfonate group.

Ink Jet Recording Apparatus and Ink Jet Recording Method

An ink jet recording apparatus of an embodiment of the invention will now be described with reference to the drawings. FIG. 1 is a schematic perspective view of the ink jet recording apparatus of an embodiment of the present invention. The ink jet recording apparatus includes a paper feed unit 101, a conveying unit 102, a recording unit 103, a protection unit 104, and a recovery unit 105. The paper feed unit 101 feeds a recording medium to the interior of the recording apparatus. The conveying unit 102 conveys the recording medium fed by the paper feed unit 101.

Figure 2:
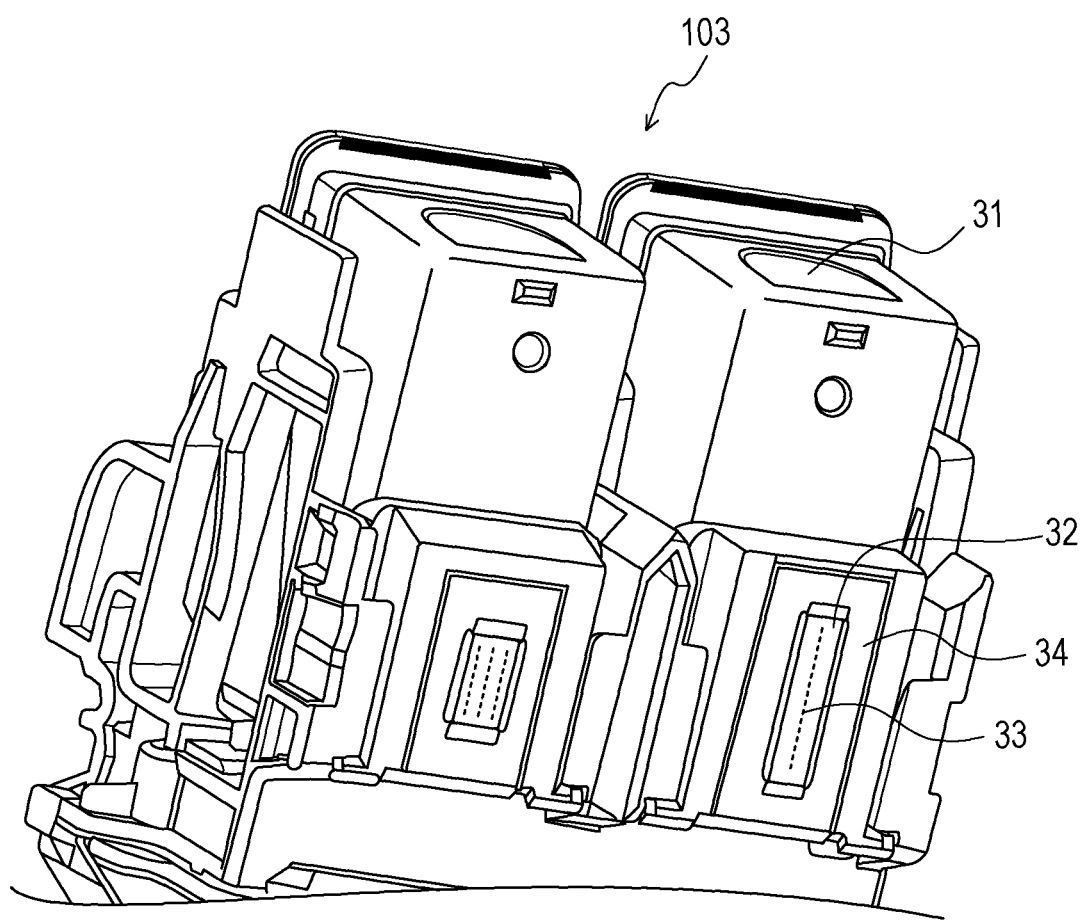
FIG. 2 is a schematic perspective view of a recording unit.

FIG. 2 is a schematic perspective view of an exemplary structure of the recording unit 103. The recording unit 103 records an image on the recording medium conveyed by the conveying unit 102 according to image data. The recording unit 103 includes an ink cartridges 31 mounted on a carriage that reciprocally moves in a main scanning direction. The ink cartridge 31 is provided with a recording head 32 on the bottom thereof. An image is recorded on the recording medium by repeating the recording operation of the recording head performed in synchronization with the movement (main-scanning operation) of the carriage and the conveyance (sub-scanning operation) of the recording medium by the predetermined pitch. For ejecting the ink, mechanical energy or thermal energy may be applied to the ink. In the present embodiment, thermal energy may be suitable.

The protection unit 104 covers the surface (ejection opening face 34, see FIG. 2) of the recording head 32 provided with the ejection openings 33 in a line therein so as to prevent the ejection openings 33 from being clogged while recording is not performed. The protection unit 104 includes a cap 41 disposed corresponding to the recording head 32. When recording is not performed, the ink cartridge 31 is moved to a position corresponding to the cap 41 by the carriage, and the cap 41 is brought into contact with the ejection opening face 34 so as to form a closed space for capping, thus preventing the liquid composition of the ink from evaporating.

Figure 3:
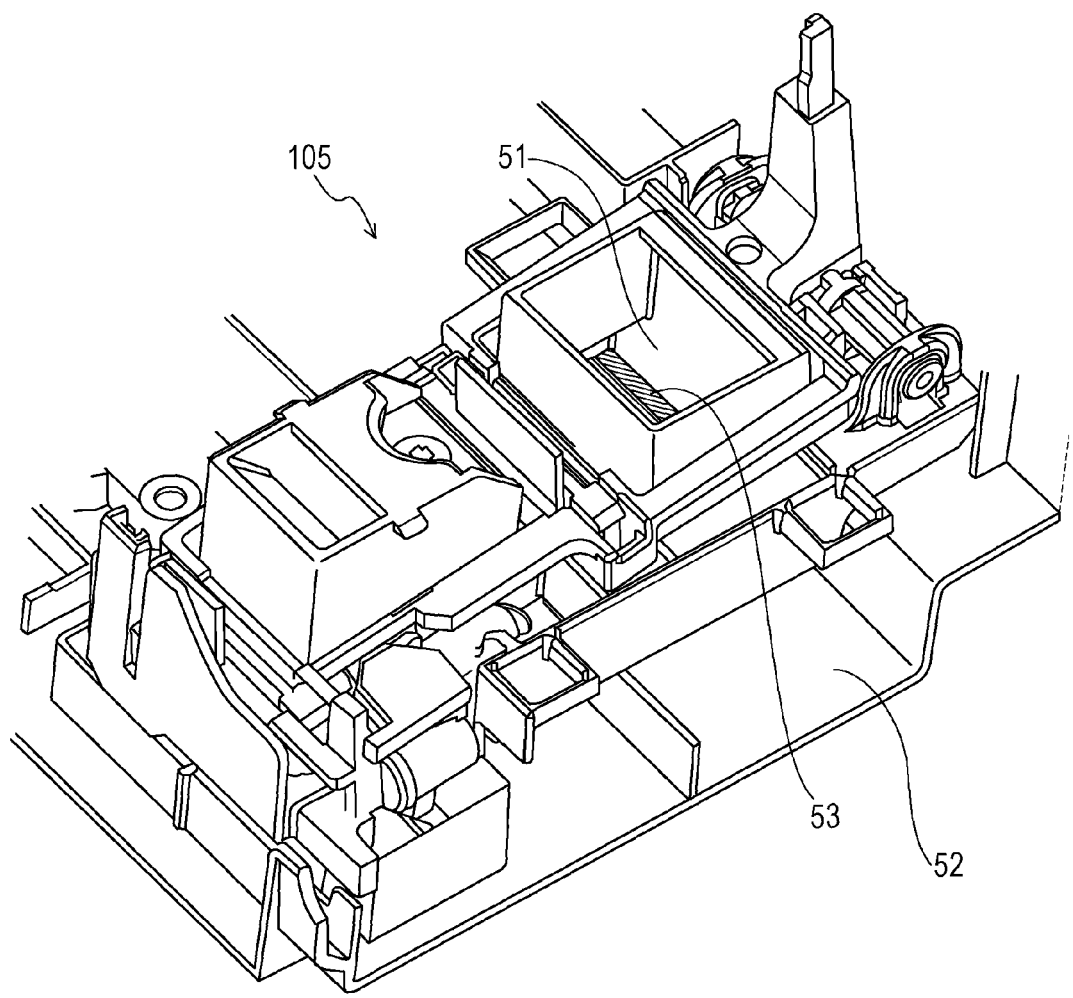
FIG. 3 is a schematic perspective view of a recovery unit.

FIG. 3 is a schematic perspective view of the recovery unit 105. The recovery unit 105 is used to maintain the capability of the recording head 32 to eject ink in a proper state. The recovery unit 105 includes an ink receiving member 51 that receives waste ink discharged from the ejection openings 33 of the recording head 32 according to preliminary ejection data. The ink receiving member 51 is disposed corresponding to the ejection openings 33 of the recording head 32, and the upper side of the ink receiving member 51 is partially open. The ink receiving member 51 may be defined by a plurality of members or components used as the walls and bottom thereof.

If the ink is not ejected for a certain period with the ejection opening face uncapped, the ink can clog the ejection openings or become thick in an ink flow channel due to the evaporation of the liquid component of the ink. This hinders proper ejection of the ink. If such an undesirable phenomenon occurs, the recording head is subjected to recovery operation for recovering the capability of properly ejecting the ink by discharging the ink from the ejection openings according to preliminary ejection data. This preliminary ejection is performed to the opening of the ink receiving member at predetermined intervals or at a time before or after recording operation, in a state where the carriage on which the recording head is mounted has been moved to a position corresponding to the ink receiving member.

In a known ink jet recording apparatus, a cap connected to a suction pump is brought into contact with the ejection opening face, and ink is forcibly discharged from the recording head by the operation of the suction pump. Alternatively, a member for scraping the deposit of the ink in the ink receiving member may be provided to suppress the deposition of the ink. The use of such a suction member or scraping member increases the weight of the recording apparatus and also leads to an increased size of the apparatus.

The ink jet recording apparatus of the present embodiment features the structure from which the suction member and the scraping member are omitted for weight reduction and downsizing. In this instance, waste ink discharged from the ejection openings according to preliminary ejection data is directly received by the ink receiving member without interposing any other members including a suction member. In addition, since the ink receiving member does not have a scraping member for scraping deposit of the ink, deposition of the ink must be suppressed by another means. Accordingly, in the present embodiment, a specific ink difficult to deposit, as described later, is used.

In order to suppress the deposition of the ink in the ink receiving member effectively, the following structure may be employed. For example, at least the wall of the ink receiving member at the lower side may be removed so that waste ink can flows out to the interior of the recording apparatus. Alternatively, the ink receiving member may be supported by another member so that the bottom thereof is separate from the inner bottom of the recording apparatus, thus allowing the waste ink to flow out efficiently. In this instance, the bottom of the ink receiving member may double as an external cover 52 (FIG. 3) of the recording apparatus.

The bottom of the ink receiving member is desirably made of a material non-absorbent to ink. Examples of the material non-absorbent to ink include polyolefin, polystyrene, epoxy, acrylic and ABS resins. If an ink-absorbent material such as porous or fibrous material is laid on the bottom of the ink receiving member, the liquid component of the ink becomes easier to diffuse, whereas the solid or pigment of the ink becomes difficult to move. This is rather disadvantageous in reducing the deposition of the ink. It is also advantageous to discharge waste ink directly to the bottom of the ink receiving member made of a material non-absorbent to ink. Although an ink absorber 53 (FIG. 3) may be laid on part of the bottom of the ink receiving member, the area of the ink absorber is desirably about half or less the area of the bottom of the ink receiving member, and more desirably about ⅓ the area of the bottom.

From the viewpoint of achieving both the downsizing of the ink jet recording apparatus and the suppression of ink deposition, the distance from the ejection opening face to the bottom of the external cover is preferably about 30 mm to 36 mm when the recording head is present at the position corresponding to the ink receiving member.

The ink jet recording method according to an embodiment of the invention uses the above-described ink jet recording apparatus. More specifically, the ink jet recording method includes recording an image on a recording medium by ejecting an aqueous ink from the ejection openings of the recording head, covering the ejection opening face of the recording head with a covering member, preliminary ejecting waste ink from the ejection openings directly to the ink receiving member separate from the covering member without interposing any other members, according to preliminary ejection data, and the method does not perform scraping deposit of the aqueous ink in the ink receiving member or sucking the aqueous ink from the ejection opening. The ink used in this method contains a self-dispersible pigment in which a functional group containing at least one anionic group of the carboxyl group and the sulfonate group is bonded to its particle surface. The other operations or steps may be performed in the same manner as in the known ink jet recording method.

Aqueous Ink

The compositions, constituents and physical properties of the ink will now be described.

Pigment

The pigment used as the coloring material in the ink is a self-dispersible pigment including a functional group containing at least one anionic group of the carboxyl group and the sulfonate group is bonded to a surface of its particle. The use of such a self-dispersible pigment allows a dispersant for dispersing the pigment in an ink to be omitted or minimized. The content of the pigment in the ink is preferably 0.10% by mass or more to 15.00% by mass or less, more preferably 1.00% by mass or more to 10.00% by mass or less.

Anionic Groups

If the carboxyl group is used as the anionic group, the water fastness of recorded images can be enhanced and becomes higher than the case using the sulfonate group. It is therefore advantageous in increasing the water fastness of the recorded images that the anionic group is the carboxyl group. In addition, the functional group bonded to the surface of the pigment particle can be a phthalate group. Since a self-dispersible pigment including a phthalate groups bonded to a surface of its surface has high aggregation force on a recording medium, the resistance to bleeding of recorded images can be increased.

The anionic group may be in an acid form or a salt form. More specifically, the anionic group may be in the form of —XH (acid) or the form of —X$^-$M$_1^+$ (salt), wherein —X represents a dissociated anionic group. M$_1^+$ represents at least one selected from the group consisting of alkali metal ions, ammonium ion, and organic ammonium ion. If the anionic group is in a salt form, part or the entirety of the anionic group may be dissociated. However, the carboxyl groups and sulfonate groups in the salt form are substantially all dissociated in the aqueous ink at normal pH (about pH5 to PH9). The counter ions (M$_1^+$) of the anionic group may be the sodium ion, the potassium ion or the ammonium ion.

Introduced Amount of Anionic Group

The introduced amount of the anionic group of the self-dispersible pigment is preferably 0.10 mmol/g or more to 2.00 mmol/g or less. More preferably, the amount of the anionic group is 0.20 mmol/g or more to 2.00 mmol/g or less, and particularly 0.20 mmol/g or more to 1.00 mmol/g or less. If the introduced amount of the anionic group is less than 0.10 mmol/g, the ejection stability of the ink and the bleeding resistance of the recorded image can be reduced to some extent. The introduced amount of the anionic group is with respect to 1 g of the pigment. The introduced amount of the anionic group of the self-dispersible pigment can be measured by colloid titration. In the Examples described later, the surface charges of the pigments in pigment dispersions were measured by colloid titration using a potentiometric automatic titrator (AT-510, manufactured by Kyoto Electronics Manufacturing) equipped with a streaming potential titration unit (PCD-500). For this measurement, methyl glycol chitosan was used as a titration reagent. Alternatively, the surface charge may be measured using the pigment appropriately extracted from the ink.

Pigments

Any pigments that can be used for ink jet recording may be used, including organic pigments and inorganic pigments such as carbon black. A dye may also be used in combination with the pigment to adjust the color. In the present embodiment, a black ink containing carbon black as the pigment is suitably used.

Salt

It has been known that the optical density of the recorded image is increased by adding a salt of a monovalent cation, such as an alkali metal ion or an ammonium ion, to the ink. The present inventors have studied salts of monovalent cation that can be added in inks used in the ink jet recording apparatus including the above-described ink receiving member. Then, the present inventors have found that when the salt meets the following conditions, both the increase of the optical density of the recorded image and the suppression of the deposition of the ink can highly satisfactorily achieved. That is, the monovalent cation of the salt is the ammonium ion, and the ratio of the mole concentration of the ammonium ion derived from the salt is more than 0.0 time and 1.7 times or less to the total amount of the introduced amount of the anionic groups of the self-dispersible pigment. The mole concentration of the ammonium ion derived from the salt and the introduced amount of anionic groups of the self-dispersible pigment is calculated as a unit of mmol/100 g of ink. The reason is as below why the salt under these conditions can suppress deposition of the ink while the optical density is increased.

That is, the ammonium ion is more hydrophilic than alkali metal ions, and accordingly can be more easily suppress the evaporation of the liquid component of the ink, particularly water. Thus, even though waste ink has been discharged and dried in the ink receiving member, the dried waste ink can be hydrated with the liquid composition in waste ink discharged afterward. Consequently, the dried waste ink becomes flowable and thus the deposition of the ink can be suppressed.

If the content of the ammonium salt added to the ink is increased while the introduced amount of the anionic groups for dispersing the self-dispersible pigment is reduced, the aggregation force of the pigment increases. Consequently, the optical density of the recorded image tends to increase, but the deposition of the ink is difficult to suppress. Accordingly, the ratio of the mole concentration of the ammonium ion derived from the salt is preferably more than 0.0 time and 1.7 times or less to the total amount of the introduced amount of the anionic groups of the self-dispersible pigment. More preferably, the ratio of the mole concentration of the ammonium ion is 0.1 time or more to 1.7 times or less from the viewpoint of increasing the optical density of the image.

If the liquid component of the ink evaporates further from the ejection openings of the recording head, the aggregation force tends to increase due to the decrease of water, and thus the ejection stability can be degraded. It is more advantageous that the ratio is preferably more than 0.0 time and 0.8 times or less from the viewpoint of obtaining high ejection stability. It is particularly advantageous from the viewpoint of achieving both high ejection stability and high optical density of the recorded image that the ratio is preferably 0.1 time or more and 0.8 time or less.

Ammonium salts that can be used in the present embodiment are combinations of a specific anion and the ammonium ion. The specific anion can be at least one ion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$. Among these, $C_6H_5COO^-$, $C_6H_4(COO^-)_2$ and $SO_4^{2-}$ are advantageous. The salts of these ions can suppress the deposition of the ink effectively.

The salt in the ink may be dissociated in part or entirely. However, the ammonium salt is substantially entirely dissociated in the aqueous ink used in the ink jet recording apparatus at normal pH (about pH5 to pH9). The content of the salt in the ink is preferably 0.01% by mass or more to 1.00% by mass or less, more preferably 0.01% by mass or more to 0.50% by mass or less with respect to the total mass of the ink, depending on the molecular weight of the salt.

Aqueous Medium

The aqueous ink of the present embodiment may contain an aqueous solvent containing water and a water-soluble organic solvent. The water may be deionized water. The content of the water in the ink is preferably 50.00% by mass or more to 95.00% by mass or less with respect to the total mass of the ink. The content of the water-soluble organic solvent in the ink is preferably 3.00% by mass or more to 50.00% by mass or less with respect to the total mass of the ink. Any of the water-soluble organic solvents intended for ink jet inks may be used, including alcohols, glycols, glycol ethers, and nitrogen containing organic compounds. In the present embodiment, for example, polyhydric alcohols such as glycerin, nitrogen-containing compound such as 2-pyrrolidone, alkylene glycols such as triethylene glycol are advantageously used. These water-soluble organic solvent may be used singly or in combination.

Other Additives

The aqueous ink may further contain a water-soluble organic compound that is solid at room temperature, such as urea, a urea derivative, trimethylolpropane, or trimethylolethane. In the present embodiment, for example, trimethylolpropane is advantageously used. The content of such a water-soluble organic compound is preferably 0.10% by mass or more to 20.00% by mass or less, more preferably 3.00% by mass or more to 10.00% by mass or less with respect to the total mass of the ink. Furthermore, the ink may optionally contain other additives, such as a surfactant, a resin, a pH adjuster, an antifoaming agent, a corrosion inhibitor, a preservative, an antifungal agent, an antioxidant, an antireductant, and a chelating agent.

Polyoxyethylene Alkyl Ether

The aqueous ink may contain a polyoxyethylene alkyl ether as a surfactant. The ink has a dynamic surface tension of preferably 40 mN/m or more, more preferably 45 mN/m or more, at 25° C. at a life time of 50 milliseconds. Such an ink allows the pigment to be present efficiently on a recording medium and can form a high-quality image on the recording medium independent of the type of the recording medium. The polyoxyethylene alkyl ether is added to impart such a dynamic surface tension to the ink. Desirably, the polyoxyethylene alkyl ether used in the ink has an HLB (hydrophilelipophile balance) value 13.0 to 20.0 when measured by the Griffin method, and whose alkyl group has a carbon number 12 to 20. The content of the polyoxyethylene alkyl ether in the ink is preferably 0.05% by mass or more to 2.00% by mass or less, more preferably 0.05% by mass or more to 1.00% by mass or less with respect to the total mass of the ink.

Physical Properties of Aqueous Ink

In the present embodiment, it is advantageous that the ink has the following physical properties. The static surface tension of the ink is preferably 28 mN/m to 45 mN/m at 25° C. The viscosity of the ink is preferably 1.0 mPa·s to 5.0 mPa·s, more preferably 1.0 mPa·s to 3.0 mPa·s, at 25° C. The pH of the ink is preferably 5 to 9 at 25° C.

EXAMPLES

The present invention will be further described in detail with reference to Examples and Comparative Examples. However, the invention is not limited to the following Examples, and also is not particularly limited unless departing from the scope thereof. For the contents or amount mentioned in the following description, "part(s)" and "%" are on a mass basis unless otherwise specified.

Preparation of Pigment Dispersion Liquid

Introduced Amount of Anionic Group of Self-Dispersible Pigment

A method for measuring the introduced amount of the anionic group to the self-dispersible pigment will first be described. The surface charge of the self-dispersible pigment in the pigment dispersion liquid was measured by potentiometric titration using a potentiometric automatic titrator AT-510 (manufactured by Kyoto Electronics Manufacturing) equipped with a streaming potential titration unit (PCD-500) and methyl glycol chitosan as a titration reagent. When the functional groups each had one anionic group, the introduced amount of the functional group was considered to be equal to that of the anionic group. When the functional groups each had two or more anionic groups, the introduced amount of the functional group was considered to be the value calculated by dividing the introduced amount of the anionic group by the number of the anionic groups in one functional group.

Pigment Dispersion Liquid 1

To the solution of 5 g of concentrated sulfuric acid in 5.5 g of water, cooled to 5° C., was added 1.0 g (5.52 mmol) of 4-aminophthalic acid. The container containing this solution was placed in an ice bath and the solution was stirred so as to be maintained at 10° C. or less. To this solution was added the solution of 2.2 g (26 mmol) of potassium nitrite in 9 g of 5° C. water. The resulting solution was stirred for another 15 minutes, and 6 g of carbon black (specific surface area: 220 m$^2$/g, dibutyl phthalate (DBP) oil absorption: 105 mL/100 g) was added with stirring. Then, the mixture was stirred for 15 minutes. The resulting slurry was subjected to diafiltration using a spectrum membrane. After substituting sodium ions for the potassium ions of the slurry by an ion exchange method, pure water was added so that the pigment content would become 10.0%, followed by dispersing the pigment to yield a dispersion liquid. Thus, pigment dispersion liquid 1 was prepared which contained a self-dispersible pigment in which a —$C_6H_3$—$(COONa)_2$ group was bonded to its particle surface. The introduced amount of the functional group was 0.26 mmol/g, and the introduced amount of the anionic group was 0.52 mmol/g.

Pigment Dispersion Liquid 2

To the solution of 5 g of concentrated sulfuric acid in 5.5 g of water, cooled to 5° C., was added 1.5 g (8.28 mmol) of 4-aminophthalic acid. The container containing this solution was placed in an ice bath and the solution was stirred so as to be maintained at 10° C. or less. To this solution was added the solution of 2.2 g (26 mmol) of potassium nitrite in 9 g of 5° C. water. The resulting solution was stirred for another 15 minutes, and 6 g of carbon black (specific surface area: 220 m$^2$/g, dibutyl phthalate (DBP) oil absorption: 105 mL/100 g) was added with stirring. Then, the mixture was stirred for 15 minutes. The resulting slurry was subjected to diafiltration using a spectrum membrane. After substituting sodium ions for the potassium ions of the slurry by an ion exchange method, pure water was added so that the pigment content would become 10.0%, followed by dispersing the pigment to yield a dispersion liquid. Thus, pigment dispersion liquid 2 was prepared which contained a self-dispersible pigment in which a —$C_6H_3$—$(COONa)_2$ group was bonded to its particle surface. The introduced amount of the functional group was 0.36 mmol/g, and the introduced amount of the anionic group was 0.72 mmol/g.

Pigment Dispersion Liquid 3

To the solution of 5 g of concentrated sulfuric acid in 5.5 g of water, cooled to 5° C., was added 2.0 g (11.04 mmol) of 4-aminophthalic acid. The container containing this solution was placed in an ice bath and the solution was stirred so as to be maintained at 10° C. or less. To this solution was added the solution of 2.2 g (26 mmol) of potassium nitrite in 9 g of 5° C. water. The resulting solution was stirred for another 15 minutes, and 6 g of carbon black (specific surface area: 220 m$^2$/g, dibutyl phthalate (DBP) oil absorption: 105 mL/100 g) was added with stirring. Then, the mixture was stirred for 15 minutes. The resulting slurry was subjected to diafiltration using a spectrum membrane. After substituting ammonium ions for the potassium ions of the slurry by an ion exchange method, pure water was added so that the pigment content would become 10.0%, followed by dispersing the pigment to yield a dispersion liquid. Thus, pigment dispersion liquid 3 was prepared which contained a self-dispersible pigment in which a —$C_6H_3$—$(COONH_4)_2$ group was bonded to its particle surface. The introduced amount of the functional group was 0.44 mmol/g, and the introduced amount of the anionic group was 0.88 mmol/g.

Pigment Dispersion Liquid 4

To the solution of 5 g of concentrated sulfuric acid in 5.5 g of water, cooled to 5° C., was added 1.55 g (11.3 mmol) of p-aminobenzoic acid. The container containing this solution was placed in an ice bath and the solution was stirred so as to be maintained at 10° C. or less. To this solution was added the solution of 1.8 g (21 mmol) of potassium nitrite in 9 g of 5° C. water. The resulting solution was stirred for another 15 minutes, and 6 g of carbon black (specific surface area: 220 m$^2$/g, dibutyl phthalate (DBP) oil absorption: 105 mL/100 g) was added with stirring. Then, the mixture was stirred for 15 minutes. The resulting slurry was subjected to diafiltration using a spectrum membrane. After substituting ammonium ions for the potassium ions of the slurry by an ion exchange method, pure water was added so that the pigment content would become 10.0%, followed by dispersing the pigment to yield a dispersion liquid. Thus, pigment dispersion liquid 4 was prepared which contained a self-dispersible pigment in which a —$C_6H_4$—$COONH_4$ group was bonded to its particle surface. The introduced amount of the functional group was 0.28 mmol/g, and the introduced amount of the anionic group was 0.28 mmol/g.

Pigment Dispersion Liquid 5

To the solution of 5 g of concentrated sulfuric acid in 5.5 g of water, cooled to 5° C., was added 0.98 g (7.14 mmol) of p-aminobenzoic acid. The container containing this solution was placed in an ice bath and the solution was stirred so as to be maintained at 10° C. or less. To this solution was added the solution of 1.8 g (21 mmol) of potassium nitrite in 9 g of 5° C. water. The resulting solution was stirred for another 15 minutes, and 6 g of carbon black (specific surface area: 220 m$^2$/g, dibutyl phthalate (DBP) oil absorption: 105 mL/100 g) was added with stirring. Then, the mixture was stirred for 15 minutes. The resulting slurry was subjected to diafiltration using a spectrum membrane. After substituting ammonium ions for the potassium ions of the slurry by an ion exchange method, pure water was added so that the pigment content would become 10.0%, followed by dispersing the pigment to yield a dispersion liquid. Thus, pigment dispersion liquid 5 was prepared which contained a self-dispersible pigment in which a —$C_6H_4$—$COONH_4$ group was bonded to its particle surface. The introduced amount of the functional group was 0.12 mmol/g, and the introduced amount of the anionic group was 0.12 mmol/g.

Pigment Dispersion Liquid 6

To the solution of 5 g of concentrated sulfuric acid in 5.5 g of water, cooled to 5° C., was added 0.73 g (5.34 mmol) of p-aminobenzoic acid. The container containing this solution was placed in an ice bath and the solution was stirred so as to be maintained at 10° C. or less. To this solution was added the solution of 1.8 g (21 mmol) of potassium nitrite in 9 g of 5° C. water. The resulting solution was stirred for another 15 minutes, and 6 g of carbon black (specific surface area: 220 m$^2$/g, dibutyl phthalate (DBP) oil absorption: 105 mL/100 g) was added with stirring. Then, the mixture was stirred for 15 minutes. The resulting slurry was subjected to diafiltration using a spectrum membrane. After substituting ammonium ions for the potassium ions of the slurry by an ion exchange method, pure water was added so that the pigment content would become 10.0%, followed by dispersing the pigment to yield a dispersion liquid. Thus, pigment dispersion liquid 6 was prepared which contained a self-dispersible pigment in which a —$C_6H_3$—$COONH_4$ group was bonded to its particle surface. The introduced amount of the functional group was 0.05 mmol/g, and the introduced amount of the anionic group was 0.05 mmol/g.

Pigment Dispersion Liquid 7

A commercially available dispersion liquid containing a self-dispersible pigment (trade name: CAB-O-JET 200, produced by Cabot) was adjusted to a dispersion liquid containing 10.0% of the pigment. The pigment dispersion liquid was used as pigment dispersion liquid 7, which contained a self-dispersible pigment in which a —$C_6H_4$—$SO_3NH_4$ group was bonded to its particle surface. The introduced amount of the functional group was 0.26 mmol/g, and the introduced amount of the anionic group was 0.26 mmol/g.

Pigment Dispersion Liquid 8

A mixture was prepared which contained 20 g of carbon black, 7 mmol of a treatment agent monosodium ((4-aminobenzoylamino)-methane-1,1-diyl)bisphosphonate, 20 mmol of nitric acid, and 200 mL of pure water. The carbon black had a specific surface area of 220 m$^2$/g and a DBP oil absorption of 105 mL/100 g. For mixing, a Silverson mixer was used at 6,000 rpm at room temperature. After 30 minutes, 20 mmol of sodium nitrite dissolved in a small amount of water was slowly added to the mixture. By this addition, the temperature of the mixture was increased to 60° C. Then, the mixture was subjected to a reaction for 1 hour under this condition. Subsequently, the resulting mixture was adjusted to a pH of 10 with an aqueous solution of sodium hydroxide. After 30 minutes, 20 mL of pure water was added, and the mixture was subjected to diafiltration using a spectrum membrane. After substituting ammonium ions for the sodium ions of the resulting mixture by an ion exchange method, pure water was added so that the pigment content would become 10.0%, followed by dispersing the pigment to yield a dispersion liquid. Thus, pigment dispersion liquid 8 was prepared which contained a self-dispersible pigment in which a ((4-aminobenzoylamino)-methane-1,1-diyl)bisphosphonate group containing ammonium ion as the counter ion was bonded to its particle surface. The introduced amount of the functional group was 0.26 mmol/g, and the introduced amount of the anionic group was 0.52 mmol/g.

Preparation of Inks

Materials were sufficiently mixed according to the composition shown in upper rows of Tables 1 to 3, and the resulting mixture was pressure-filtered through a propylene filter having a pore size of 2.5 μm (manufactured by Pall) to yield an ink. NIKKOL BL-9EX shown in the Tables is polyoxyethylene lauryl ether produced by Nikko Chemicals that is a surfactant having an HLB value, measured by the Griffin method, of 13.6 and containing 9 moles of added ethylene oxide in a molecule. Lower rows in Tables 1 to 3 show the content ($A_1$) of the monovalent cation derived from the salt, the content (A) of the ammonium ion derived from the monovalent cation, and the total introduced amount (B) of the anionic groups (each in terms of mmol in 100 g of ink), and A/B ratio ($A_1$/B for Examples 10 to 12).

The contents $A_1$ and A were calculated using the equation: [weight (g) of salt in 100 g of ink]/[molecular weight of the salt (g/mol)]×(number of cations in one molecule of the salt)× 1000. The amount B was calculated using the equation: [weight (g) of self-dispersible pigment in 100 g of ink]× [introduced amount (mmol/g) of functional groups to the self-dispersible pigment]×(number of anionic groups in one functional group).

TABLE 1

Compositions and Properties of Inks

| | Ink No. | | | | | | | | |
|---|---|---|---|---|---|---|---|---|---|
| | 1 | 2 | 3 | 4 | 5 | 6 | 7 | 8 | 9 |
| Pigment dispersion liquid 1 | 30.00 | | | | | | | | |
| Pigment dispersion liquid 2 | | 30.00 | | | | | | | |
| Pigment dispersion liquid 3 | | | 30.00 | | | | | 30.00 | 30.00 |
| Pigment dispersion liquid 4 | | | | 30.00 | | | | | |
| Pigment dispersion liquid 5 | | | | | 30.00 | | | | |
| Pigment dispersion liquid 6 | | | | | | 30.00 | | | |
| Pigment dispersion liquid 7 | | | | | | | 30.00 | | |
| Pigment dispersion liquid 8 | | | | | | | | | |
| Diammonium phthalate | 0.12 | 0.17 | 0.20 | 0.07 | 0.03 | 0.01 | 0.06 | 0.10 | |
| Diammonium sulfate | | | | | | | | | 0.14 |
| Ammonium benzoate | | | | | | | | | |
| Disodium phthalate | | | | | | | | | |
| Dipotassium phthalate | | | | | | | | | |
| Dilithium phthalate | | | | | | | | | |
| Glycerin | 8.00 | 8.00 | 8.00 | 8.00 | 8.00 | 8.00 | 8.00 | 8.00 | 8.00 |
| 2-Pyrrolidone | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 | 5.00 |
| NIKKOL BL-9EX | 0.12 | 0.12 | 0.12 | 0.12 | 0.12 | 0.12 | 0.12 | 0.12 | 0.12 |
| Pure water | 46.76 | 46.71 | 46.68 | 46.81 | 46.85 | 46.87 | 46.82 | 46.78 | 46.74 |
| Content $A_1$ of monovalent cation derived from salt | 1.20 | 1.70 | 2.00 | 0.70 | 0.30 | 0.10 | 0.60 | 1.00 | 2.12 |
| Content A of ammonium ion derived from salt | 1.20 | 1.70 | 2.00 | 0.70 | 0.30 | 0.10 | 0.60 | 1.00 | 2.12 |

TABLE 1-continued

Compositions and Properties of Inks

| | Ink No. | | | | | | | | |
|---|---|---|---|---|---|---|---|---|---|
| | 1 | 2 | 3 | 4 | 5 | 6 | 7 | 8 | 9 |
| Total introduced amount B of anionic groups | 1.56 | 2.16 | 2.64 | 0.84 | 0.36 | 0.15 | 0.78 | 2.64 | 2.64 |
| A/B ratio (or $A_1$/B ratio) | 0.8 | 0.8 | 0.8 | 0.8 | 0.8 | 0.7 | 0.8 | 0.4 | 0.8 |

TABLE 2

Compositions and Properties of Inks

| | Ink No. | | | | | | | | |
|---|---|---|---|---|---|---|---|---|---|
| | 10 | 11 | 12 | 13 | 14 | 15 | 16 | 17 | 18 |
| Pigment dispersion liquid 1 | | | | | | | | | |
| Pigment dispersion liquid 2 | | | | | | | | | 30.00 |
| Pigment dispersion liquid 3 | 30.00 | | 30.00 | 30.00 | 30.00 | 30.00 | | | |
| Pigment dispersion liquid 4 | | | | | | | 30.00 | | |
| Pigment dispersion liquid 5 | | | | | | | | | |
| Pigment dispersion liquid 6 | | | | | | | | | |
| Pigment dispersion liquid 7 | | 30.00 | | | | | | 30.00 | |
| Pigment dispersion liquid 8 | | | | | | | | | |
| Diammonium phthalate | | | | | | | | | 0.36 |
| Diammonium sulfate | | | | | | | | | |
| Ammonium benzoate | 0.28 | 0.09 | | | | | | | |
| Disodium phthalate | | | 0.48 | | | | | | |
| Dipotassium phthalate | | | | 0.55 | | | | | |
| Dilithium phthalate | | | | | 0.40 | | | | |
| Glycerin | 8.00 | 8.00 | 8.00 | 8.00 | 8.00 | 8.00 | 8.00 | 8.00 | 8.00 |
| 2-Pyrrolidone | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 | 5.00 |
| NIKKOL BL-9EX | 0.12 | 0.12 | 0.12 | 0.12 | 0.12 | 0.12 | 0.12 | 0.12 | 0.12 |
| Pure water | 46.60 | 46.79 | 46.40 | 46.33 | 46.48 | 46.88 | 46.88 | 46.88 | 46.52 |
| Content $A_1$ of monovalent cation derived from salt | 2.01 | 0.65 | 4.57 | 4.54 | 4.49 | — | — | — | 3.60 |
| Content A of ammonium ion derived from salt | 2.01 | 0.65 | 4.57 | 4.54 | 4.49 | — | — | — | 3.60 |
| Total introduced amount B of anionic groups | 2.64 | 0.78 | 2.64 | 2.64 | 2.64 | 2.64 | 0.84 | 0.78 | 2.16 |
| A/B ratio (or $A_1$/B ratio) | 0.8 | 0.8 | 1.7 | 1.7 | 1.7 | — | — | — | 1.7 |

TABLE 3

Compositions and Properties of Inks

| | Ink No. | | | | | | | | |
|---|---|---|---|---|---|---|---|---|---|
| | 19 | 20 | 21 | 22 | 23 | 24 | 25 | 26 | 27 |
| Pigment dispersion liquid 1 | | | | 30.00 | | | | | |
| Pigment dispersion liquid 2 | | | | | 30.00 | | | | |
| Pigment dispersion liquid 3 | 30.00 | | | | | 30.00 | | | |
| Pigment dispersion liquid 4 | | 30.00 | | | | | 30.00 | | |
| Pigment dispersion liquid 5 | | | | | | | | | |
| Pigment dispersion liquid 6 | | | | | | | | | |
| Pigment dispersion liquid 7 | | | 30.00 | | | | | 30.00 | |
| Pigment dispersion liquid 8 | | | | | | | | | 30.00 |
| Diammonium phthalate | 0.45 | 0.14 | 0.13 | 0.28 | 0.39 | 0.47 | 0.15 | 0.14 | 0.52 |
| Diammonium sulfate | | | | | | | | | |
| Ammonium benzoate | | | | | | | | | |
| Disodium phthalate | | | | | | | | | |
| Dipotassium phthalate | | | | | | | | | |
| Dilithium phthalate | | | | | | | | | |
| Glycerin | 8.00 | 8.00 | 8.00 | 8.00 | 8.00 | 8.00 | 8.00 | 8.00 | 8.00 |

TABLE 3-continued

Compositions and Properties of Inks

| | Ink No. | | | | | | | | |
|---|---|---|---|---|---|---|---|---|---|
| | 19 | 20 | 21 | 22 | 23 | 24 | 25 | 26 | 27 |
| 2-Pyrrolidone | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 |
| Trimethylolpropane | 5.00 | 5.00 | 5.00 | 5.00 | 5.00 | 5.00 | 5.00 | 5.00 | 5.00 |
| NIKKOL BL-9EX | 0.12 | 0.12 | 0.12 | 0.12 | 0.12 | 0.12 | 0.12 | 0.12 | 0.12 |
| Pure water | 46.43 | 46.74 | 46.75 | 46.60 | 46.49 | 46.41 | 46.73 | 46.74 | 46.36 |
| Content $A_1$ of monovalent cation derived from salt | 4.50 | 1.40 | 1.30 | 2.80 | 3.90 | 4.70 | 1.50 | 1.40 | 5.20 |
| Content A of ammonium ion derived from salt | 4.50 | 1.40 | 1.30 | 2.80 | 3.90 | 4.70 | 1.50 | 1.40 | 5.20 |
| Total introduced amount B of anionic groups | 2.64 | 0.84 | 0.78 | 1.56 | 2.16 | 2.64 | 0.84 | 0.78 | 3.12 |
| A/B ratio (or $A_1$/B ratio) | 1.7 | 1.7 | 1.7 | 1.8 | 1.8 | 1.8 | 1.8 | 1.8 | 1.7 |

Evaluation

The inks prepared as above were evaluated as below. The recording apparatus used for the evaluation was an ink jet recording apparatus PIXUS iP2700 (manufactured by Canon) including a recording head that ejects ink by thermal energy. For the recording duty in use of this recording apparatus, when an image is formed with a black ink under the conditions where one droplet of 25 ng±10% of the ink was applied to a unit region of 1/600 inch×1/600, the recording duty of the resulting image is defined as 100%. For color inks, when an image is formed under the conditions where two droplets, each having a mass of 5.7 ng±10%, of the ink are applied to a unit region of 1/600 inch×1/600 inch, the recording duty of the resulting image is defined as 100%. For rating for the evaluation, AA, A and B represent acceptable levels, and C represents unacceptable level. The results are shown in Table 4.

Suppression of Deposition

Each of the prepared inks was concentrated by 10% on a mass basis by evaporation in an open container, thus yielding a concentrated ink. An ink cartridge (31 in FIG. 2) charged with the concentrated ink was mounted on the above-mentioned ink jet recording apparatus whose protection unit (104 in FIG. 1) and recovery unit (105 in FIGS. 2 and 3) had been modified as shown in FIGS. 1 to 3. The recovery unit was supported by a supporting member and thus disposed away from the bottom of the ink receiving member 51. The bottom of the ink receiving member 51 doubled as an external cover (52 in FIG. 3) of the recording apparatus. The external cover, made of polystyrene, was adapted to receive waste ink directly, and an ink absorber (53 in FIG. 3) made of a fibrous ink absorbent was disposed over an area of about 1/3 of the bottom of the ink receiving member. The distance from the ejection opening face to the bottom of the external cover was set so as to be about 35.5 mm when the recording head was present at the position corresponding to the ink receiving member.

Thus, solid patterns (19 cm×26 cm) with a recording duty of 7% was recorded on 3,500 sheets of A4 recording media (trade name: PB PAPER, manufactured by Canon) at intervals of 10 minutes at a temperature of 30° C. and a relative humidity of 10%. During recording, 0.21 mg±10% of waste ink was discharged to the ink receiving member according to preliminary ejection data before recording the solid pattern on each recording medium. In addition, 0.1 g±30% of waste ink was discharged to the ink receiving member once to clean the recording head after each operation of recording the solid patterns on 100 sheets of the recording media. On the completion of recording on 3,500 sheets of the recording media, the bottom of the ink receiving member was visually observed. If the sample at this time was rated as B, solid patterns were further recorded on another 1,500 sheets, and the sample was rated as A. For samples rated as A, the same solid patterns were further recorded on another 5,000 sheets. Then, the ink receiving member after the completion of the recording was visually observed for evaluating the suppression of deposition of the ink. The reason why the concentrated inks were used for evaluation is to conduct the evaluation under more severe conditions in order to confirm that the inks are difficult to deposit in the ink receiving member and thus have superior characteristics.

AA: No deposit of ink was observed on the bottom of the ink receiving member after recording 10,000 sheets.

A: No deposit of ink was observed on the bottom of the ink receiving member after recording 5,000 sheets.

B: No deposit of ink was observed on the bottom of the ink receiving member after recording 3,500 sheets.

C: Deposit of ink was observed on the bottom of the ink receiving member after recording 3,500 sheets.

Optical Density

Ink cartridges charged with each of the inks prepared above were mounted in an ink jet recording apparatus (not modified). Then, solid patterns (2 cm×2 cm each) with a recording duty of 100% were recorded on a recording medium (trade name: Economy white Plus, manufacture by Office DEPOT) to yield a recorded article. A day after the recording, the optical density of the recorded article was measured with a reflection densitometer "Macbeth RD-918" (trade name), manufactured by Macbeth. The results were rated according the following criteria:

A: optical density was 1.32 or more.

B: optical density was 1.00 or more and less than 1.32.

C: optical density was less than 1.00.

Ejection Stability

Ink cartridges charged with each of the inks prepared above were mounted in an ink jet recording apparatus (not modified). Then, solid patterns (19 cm×26 cm each) with a recording duty of 100% were recorded on 10 sheets of recording media (trade name: PB PAPER, manufacture by Canon). The solid pattern on the 10th sheet was visually observed and the results were rated according to the following criteria:

AA: Ejection was stable and white streaks or fading was not observed in the solid pattern.

A: Ejection was stable, but white streaks or fading were slightly observed.

B: Ejection was stable, but white streaks or fading was observed in the solid pattern.

C: Ejection was not stable and white streaks or fading was observed in the solid pattern.

Water Fastness

Ink cartridges charged with each of the inks prepared above were mounted in an ink jet recording apparatus (not modified). Then, solid patterns (2 cm×2 cm each) with a recording duty of 100% were recorded on the following three recording media to yield recorded articles. The recording media used were PB PAPER (manufactured by Canon), Canon Extra Multifunctional Paper (manufactured by Canon) and Bright White Inkjet Paper (manufactured by Hewlett Packard). A day after being recorded, the solid patterns on the recording media were watered, and then the state of blots of the ink having flown out of the solid pattern to the blank region of the recording medium was visually observed. For the recorded article, of the recorded articles prepared using the three recording media, having intermediate-level ink blots, water fastness was examined according to the following criteria:

A: Ink did not flow out to the blank region.

B: Ink flowed slightly out to the blank region.

C: A considerable amount of ink flowed to the blank region and the solid pattern was paled.

Bleeding Resistance

Images recorded using the inks (black inks) prepared above and a yellow ink of BC-311 color (manufactured by Canon) were evaluated for bleeding resistance. The yellow ink of BC-311 is a color ink containing a dye as a coloring material. Ink cartridges each charged with any of these inks were mounted in an ink jet recording apparatus (not modified). A black solid pattern (2 cm×2 cm) with a duty of 100% and a yellow solid pattern (2 cm×2 cm) with a duty of 70% were recorded closely to each other on a recording media PB PAPER (manufactured by Canon) to yield a recorded article. Then, the resulting recorded articles were examined for bleeding resistance by visual observation of the boundary between the solid patterns of the resulting recorded article. The bleeding resistance was rated according the following criteria:

A: Bleeding was not observed.

B: Slight bleeding was observed.

C: Bleeding was so serious that the boundary between the two patterns was not clear.

TABLE 4

| | | | Evaluation Results | | | |
|---|---|---|---|---|---|---|
| | Ink No. | Suppression of Deposition | Optical density | Ejection stability | Water fastness | Bleeding resistance |
| Example | 1 | 1 | AA | A | AA | A | A |
| | 2 | 2 | AA | A | AA | A | A |
| | 3 | 3 | AA | A | AA | A | A |
| | 4 | 4 | AA | A | AA | A | B |
| | 5 | 5 | AA | A | AA | A | B |
| | 6 | 6 | AA | A | AA | A | B |
| | 7 | 7 | AA | A | AA | B | B |
| | 8 | 8 | AA | A | AA | A | A |
| | 9 | 9 | AA | A | AA | A | A |
| | 10 | 10 | AA | A | AA | A | A |
| | 11 | 11 | AA | A | AA | B | B |
| | 12 | 12 | B | A | B | A | A |
| | 13 | 13 | B | A | B | A | A |
| | 14 | 14 | B | A | B | A | A |
| | 15 | 15 | AA | B | AA | A | A |
| | 16 | 16 | AA | B | AA | A | B |
| | 17 | 17 | AA | B | AA | B | B |
| | 18 | 18 | A | A | A | A | A |
| | 19 | 19 | A | A | A | A | A |
| | 20 | 20 | A | A | A | A | B |
| | 21 | 21 | A | A | A | B | B |
| | 22 | 22 | B | A | B | A | A |
| | 23 | 23 | B | A | B | A | A |
| | 24 | 24 | B | A | B | A | A |
| | 25 | 25 | B | A | B | A | B |
| | 26 | 26 | B | A | B | B | B |
| Comparative Example | 1 | 27 | C | A | C | A | B |

In the comparison between Examples 5 and 6, the ejection stability and bleeding resistance of Example 5 were superior to those of Example 6.

Table 4 suggests that deposition of ink, which is likely to occur in an ink jet recording apparatus of the type in which waste ink is discharged directly in an ink receiving member without interposing any other members, can be suppressed by using an ink containing a self-dispersible pigment containing the sulfonate group or the carboxyl group. Also, the optical density of recorded images was able to be increased by adding a salt of a monovalent cation. In particular, in use of an ammonium salt with a specific content such that the ratio of the content of the ammonium ion to the introduced amount of the anionic group to the self-dispersible pigment is in a specific range, both the optical density of the recorded image and the suppression of deposition of ink were achieved. In use of an alkali metal salt, on the other hand, even if the ratio is in a specific range, the degree of the suppression of deposition was smaller than the case of using an ammonium salt.

Embodiments of the present invention provide an ink jet recording apparatus and an ink jet recording method which employ a mechanism that discharges waste ink directly to an ink receiving member from a recording head, and in which the deposition of ink in the ink receiving member can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-150361 filed Jul. 19, 2013, which is hereby incorporated by reference herein in its entirety.

What is claimed is:

1. Ink jet recording apparatus comprising:
    a recording unit including a recording head having a surface provided with an ejection opening therein;
    an aqueous ink that is ejected from the ejection opening to record an image on a recording medium;
    a protection unit including a covering member that covers the surface having the ejection opening; and
    a recovery unit separate from the covering member, having no member that scrapes the ink deposited on the ink receiving member or sucks the ink from the ejection opening, the recovery unit including an ink receiving member that receives waste ink directly from the ejection opening without interposing any other member, the waste ink being a portion of the ink discharged according to preliminary ejection data;

wherein the aqueous ink containing a self-dispersible pigment in which a functional group containing at least one anionic group of a carboxyl group and a sulfonate group is bonded to the particle surface thereof.

2. The ink jet recording apparatus according to claim 1, wherein the aqueous ink further contains a salt of an ammonium ion and an anion selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$, and $H_2PO_4^-$, and the ratio of the amount by mmol/100 g of ink of the ammonium ion derived from the salt is more than 0.0 time and 1.7 times or less to the total amount by mmol/100 g of ink of the introduced amount of the anionic group of the self-dispersible pigment.

3. The ink jet recording apparatus according to claim 2, wherein the ratio of the amount of the ammonium ion to the total amount of the introduced amount of the anionic group is more than 0.0 time and 0.8 times or less on a mole basis.

4. The ink jet recording apparatus according to claim 2, wherein the content of the salt in the ink is 0.01% by mass or more to 0.50% by mass or less with respect to the total mass of the ink.

5. The ink jet recording apparatus according to claim 1, wherein the anionic group is the carboxy group.

6. The ink jet recording apparatus according to claim 1, wherein the functional group is a phthalate group.

7. The ink jet recording apparatus according to claim 1, wherein the introduced amount of the anionic group of the self-dispersible pigment is 0.10 mmol/g or more to 2.00 mmol/g or less.

8. The ink jet recording apparatus according to claim 1, wherein the introduced amount of the anionic group of the self-dispersible pigment is 0.20 mmol/g or more to 2.00 mmol/g or less.

9. The ink jet recording apparatus according to claim 1, wherein the ink receiving member has a bottom made of a material unabsorbent to ink.

10. The ink jet recording apparatus according to claim 1, wherein the ink receiving member includes a bottom provided with an ink absorber in an area less than or equal to half the area of the bottom.

11. An ink jet recording method comprising:

recording an image on a recording medium by ejecting an aqueous ink from an ejection opening provided in a surface of a recording head;

covering the surface having the ejection opening for protection with a covering member; and preliminary ejecting waste ink from the ejection opening directly to an ink receiving member being separate from the covering member according to preliminary ejection data without interposing any other member, wherein the method does not perform scraping deposit of the aqueous ink on the ink receiving member or sucking the aqueous ink from the ejection opening, and the aqueous ink, used in the recording, containing a self-dispersible pigment in which a functional group containing at least one anionic group of a carboxyl group and a sulfonate group is bonded to its particle surface.

* * * * *